July 6, 1948.  C. R. SYMMES  2,444,861
FROZEN-FOOD CONTAINER
Filed Nov. 9, 1945

Inventor
Carleton R. Symmes
By Roberts, Cushman & Grow
attys.

Patented July 6, 1948

2,444,861

UNITED STATES PATENT OFFICE 2,444,861

FROZEN-FOOD CONTAINER

Carleton R. Symmes, Saugus, Mass., assignor to H. P. Hood & Sons, Inc., Charlestown, Mass., a corporation of Massachusetts Application November 9, 1945, Serial No. 627,590

3 Claims. (Cl. 229—14)

This invention relates to the art of packaging ice cream and other frozen foods and has for its object the provision of a container which is simple and economical in construction, which can be readily filled, which will withstand rough handling, which retards the rate of thawing of the contents when the container is subjected to a temperature above freezing, which facilitates removal of the frozen contents, which need not be mutilated in removing the contents and which may impart to the outer surface of the frozen mass of food an ornamental configuration.

According to the present invention the container comprises a casing in combination with a closure fitted into one end of the casing for movement toward the opposite end of the casing and a liner for the casing which is slidable endwise in the casing in response to said movement. The outside surface of the liner or the inside surface of the casing may have a coating of paraffin wax or the like to prevent the two surfaces from freezing tightly together. Preferably the liner is split endwise of the casing so that it may be peeled from the frozen contents after ejection. To facilitate peeling the liner off the food a tab may be provided on one edge of the split and in the preferred embodiment a tab is provided on each edge of the split, the two tabs being offset relatively to each other so that each is readily accessible. The liner may be shaped to emboss the circumferential surface of the frozen mass of food. The liner has sufficient longitudinal rigidity to be pushed upwardly by the bottom, and in the preferred embodiment the liner has corrugations extending endwise of the casing. When the corrugations are presented to the contents they serve to emboss the circumferential surface of the contents of the container as aforesaid, and when presented to the inner surface of the casing they serve to reduce the tendency for the liner to freeze to the casing. In the preferred embodiment the liner comprises two layers secured together, the inner layer having the aforesaid corrugations and the outer layer comprising a smooth sheet of paper which may carry on its outer face advertising or decorative matter or both.

For the purpose of illustration typical embodiments of the invention are shown in the accompanying drawings in which Fig. 1 is a side view of a cylindrical container with parts in section;

Figure 1:
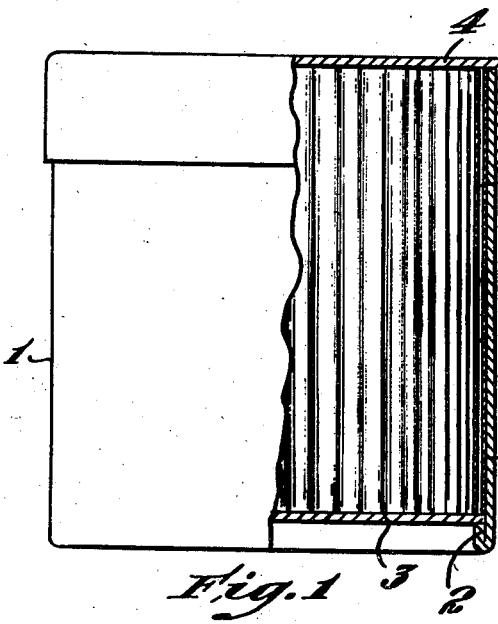
Figure 2:
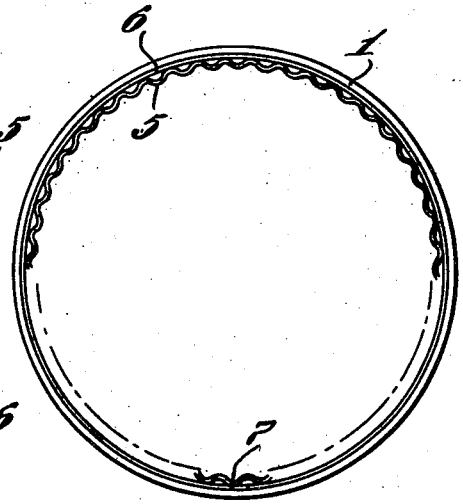
Fig. 2 is a top plan view of the cylindrical container with the cover removed.
Figure 3:
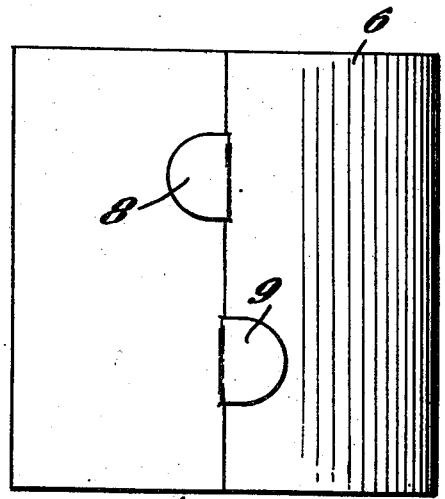
Fig. 3 is a side view of the preferred liner.

The particular embodiment illustrated in Figs. 1, 2 and 3 comprises a cylindrical casing 1 of cardboard or other suitable material having its lower edge folded inwardly as indicated at 2, a stiff bottom closure in the form of a disk 3 of cardboard which seats on the inturned edge 2, a cover 4 which telescopes over the casing, and a liner comprising an inner corrugated layer 5 secured to an outer sheet 6. As shown in Fig. 3 the outer layer 6 of the liner is provided with two tabs 8 and 9 offset from each other endwise of the container, one tab projecting across the split from one edge of the split and the other tab projecting in the opposite direction from the opposite edge of the split.

Figure 4:
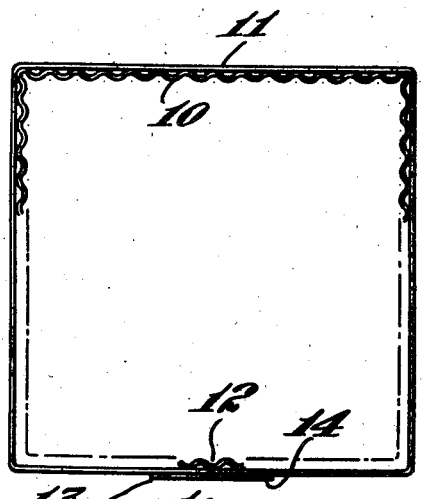
Fig. 4 is an end view of a liner for a square container.
Figure 5:
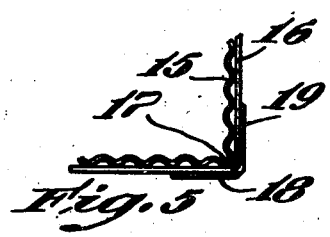
Fig. 5 is an end view of a modified liner for a square container.

The modified liners shown in Figs. 4 and 5 are similar to that above described except in that they are square in cross-section for use in a square casing. The liner of Fig. 4 comprises inner and outer layers 10 and 11, both layers being split at 12 and the outer layer having tabs 13 and 14 corresponding to 8 and 9 of Fig. 3. The liner of Fig. 5 comprises inner and outer layers 15 and 16, both being split at 17 and the outer layer having tabs 18 and 19.

In filling the container the food is preferably placed in the container before it is completely frozen. When the inner face of the liner is provided with corrugations or other shape of embossing, the contents are preferably forced into the container under slight pressure so that the periphery of the mass of food conforms to the configuration of the inner surface of the liner. Thus in filling one of the containers with ice cream, the frozen mixture is forced in under slight pressure while it is still free to flow in response to pressure. After the container is filled and the cover 4 has been applied, the freezing operation is continued until the contents become rigid.

To empty one of the containers the cover is removed and the bottom 3 is forced upwardly to eject the liner and contents. Then the liner may be readily peeled from the block of frozen food by grasping one tab with one hand and the other tab with the other hand. As indicated above, the surfaces of the liner and casing may be treated with paraffin wax or other material which prevents the liner from freezing tightly to the casing, and if necessary the inner surface of the liner may be similarly treated to prevent the food from freezing tightly to the inner surface of the liner.

It will be understood of course that the corrugated liner serves not only to give the circumference of the frozen block of food a decorative configuration but also, by virtue of its insulating quality, to retard the rate of thawing when contents are subjected to temperatures above freezing. Any one of the liners may be used as a wrapper without an outer casing.

It should be understood that the present disclosure is for the purpose of illustration only and that this invention includes all modifications and equivalents which fall within the scope of the appended claims.

I claim:

1. A frozen-food container comprising a cylindrical casing having one end margin only turned inwardly to form a ledge, a stiff bottom supported by the ledge throughout substantially the entire circumference thereof and being movable upwardly through the container in response to upward pressure on its under side, and a cylindrical liner resting on the bottom and slidable endwise in the container, the liner having sufficient longitudinal rigidity to be pushed upwardly by said bottom without collapsing, whereby the contents of the container may be ejected from the upper end of the container while still wrapped in the liner by upward pressure on the bottom, the liner being split endwise of the casing throughout its extent so that it may be peeled from the frozen contents after being ejected and having a tab on each edge of the split to facilitate peeling, each tab being confined to a portion of the length of the liner and the two tabs being offset relatively to each other lengthwise of the split, whereby the tabs may extend across the split into overlapping relationship with the margin of the liner on the other side of the split without interfering with each other.

2. A frozen-food container comprising a cylindrical casing having only one end margin turned inwardly to form a ledge, the other end being unconstricted to permit free egress of the frozen contents, a stiff bottom supported by the ledge throughout substantially the entire circumference thereof and being movable upwardly through the container in response to upward pressure on its under side, and a cylindrical liner resting on the bottom and slidable endwise in the container, the liner having sufficient longitudinal rigidity to be pushed upwardly by said bottom without collapsing, whereby the contents of the container may be ejected from the upper end of the container while still wrapped in the liner by upward pressure on the bottom, the liner being split endwise of the casing throughout its extent so that it may be peeled from the frozen contents after being ejected.

3. A frozen-food container comprising a cylindrical casing having only one end margin turned inwardly to form a ledge, the other end being unconstricted to permit free egress of the frozen contents, a stiff bottom supported by the ledge throughout substantially the entire circumference thereof and being movable upwardly through the container in response to upward pressure on its under side, and a cylindrical liner resting on the bottom and slidable endwise in the container, the liner having longitudinal corrugations to afford sufficient longitudinal rigidity to be pushed upwardly by said bottom without collapsing, whereby the contents of the container may be ejected from the upper end of the container while still wrapped in the liner by upward pressure on the bottom, the liner being split endwise of the casing throughout its extent so that it may be peeled from the frozen contents after being ejected.

CARLETON R. SYMMES.

REFERENCES CITED

The following references are of record in the file of this patent:

UNITED STATES PATENTS

| Number | Name | Date |
| --- | --- | --- |
| 679,747 | Hess et al. | Aug. 6, 1901 |
| 1,098,178 | Semple | May 26, 1914 |
| 1,343,391 | Haas | June 15, 1920 |
| 1,481,700 | Fatland | Jan. 22, 1924 |
| 1,511,915 | Sherk | Oct. 14, 1924 |
| 1,608,543 | Woodbridge | May 30, 1926 |
| 2,001,477 | Vogt | May 14, 1935 |
| 2,005,245 | Stover | June 18, 1935 |
| 2,019,552 | Watts | Nov. 5, 1935 |
| 2,255,492 | Peters | Sept. 9, 1941 |
| 2,352,645 | Liebmann | July 4, 1944 |